(No Model.) 3 Sheets—Sheet 1.

W. BAUR.
FILTER PRESS.

No. 365,565. Patented June 28, 1887.

Witnesses
Inventor

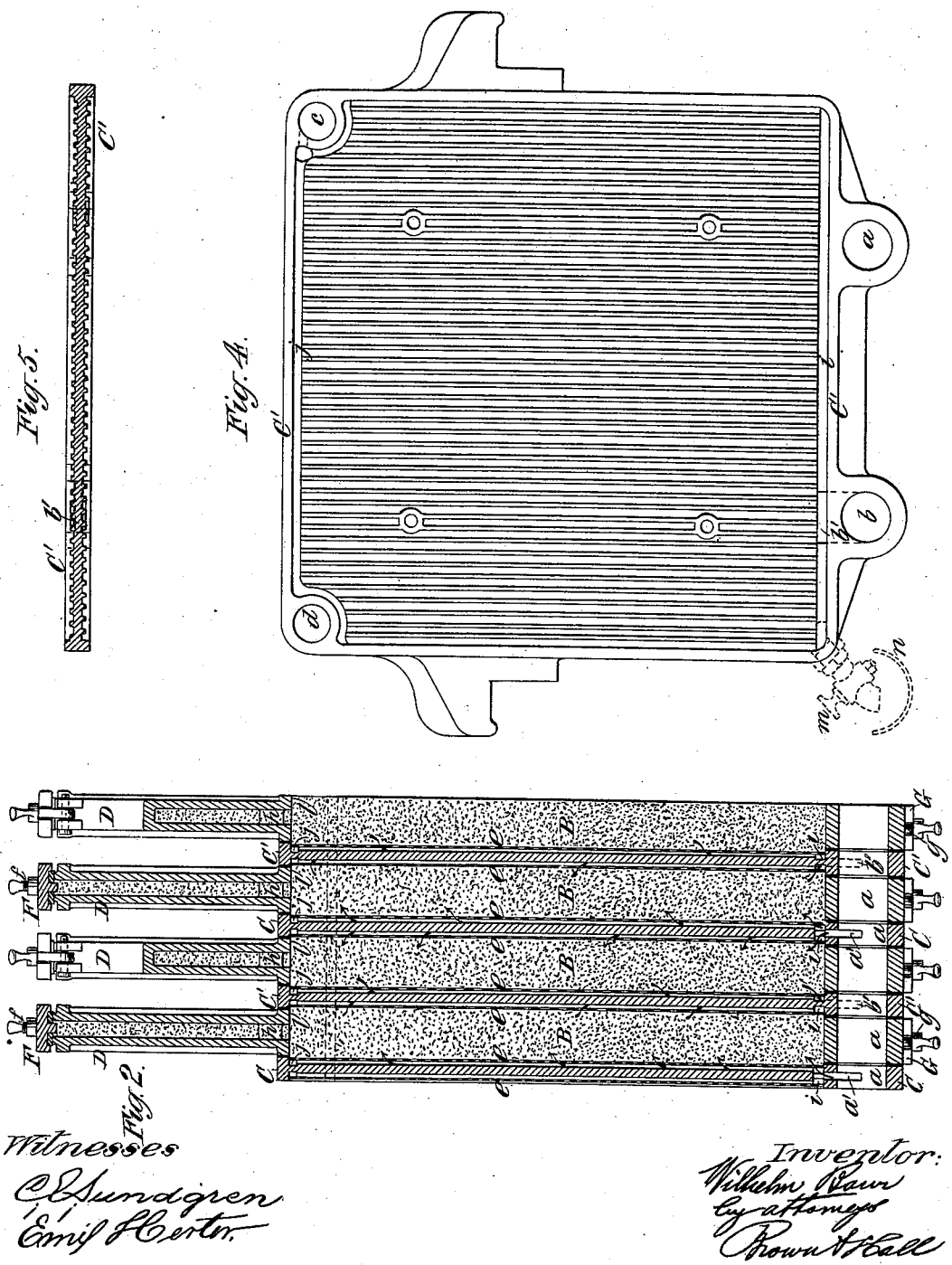

(No Model.) 3 Sheets—Sheet 3.
W. BAUR.
FILTER PRESS.
No. 365,565. Patented June 28, 1887.
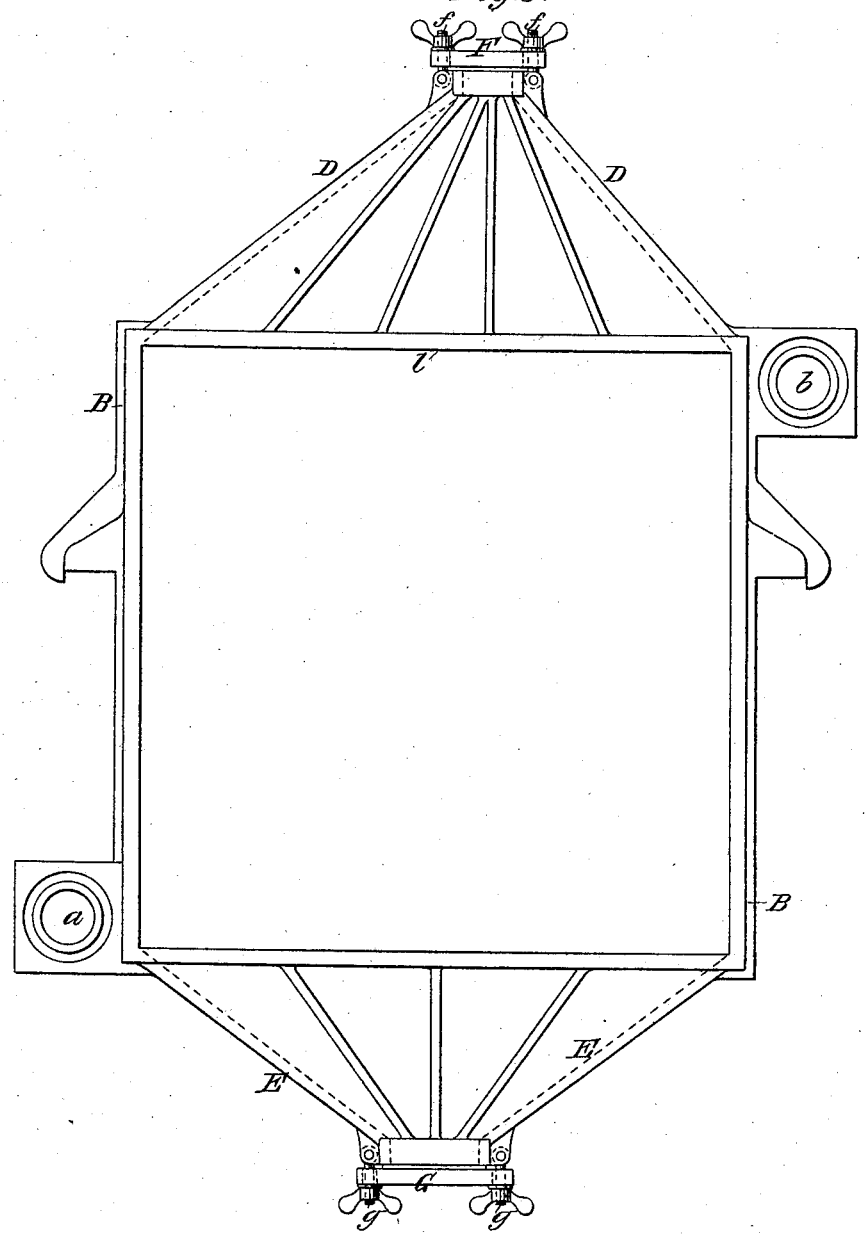

United States Patent Office.

WILHELM BAUR, OF BROOKLYN, NEW YORK.

FILTER-PRESS.

SPECIFICATION forming part of Letters Patent No. 365,565, dated June 28, 1887.

Application filed March 3, 1887. Serial No. 229,539. (No model.)

*To all whom it may concern:*

Be it known that I, WILHELM BAUR, of Brooklyn, in the county of Kings and State of New York, have invented a new and useful Improvement in Filter-Presses, of which the following is a specification.

The object of this invention is to provide more efficiently for the employment in a filter-press of bone-black or other coal, sand, gravel, peat, sawdust, or other granular or pulverulent filtering material.

To this end the improvement consists in the novel construction and combinations of the filter frames or chambers and interposed filter-plates, hereinafter described and claimed, whereby such provision is afforded.

The invention is illustrated in the accompanying drawings, from which all parts of the press not necessary to explain the invention are omitted.

Figure 1:
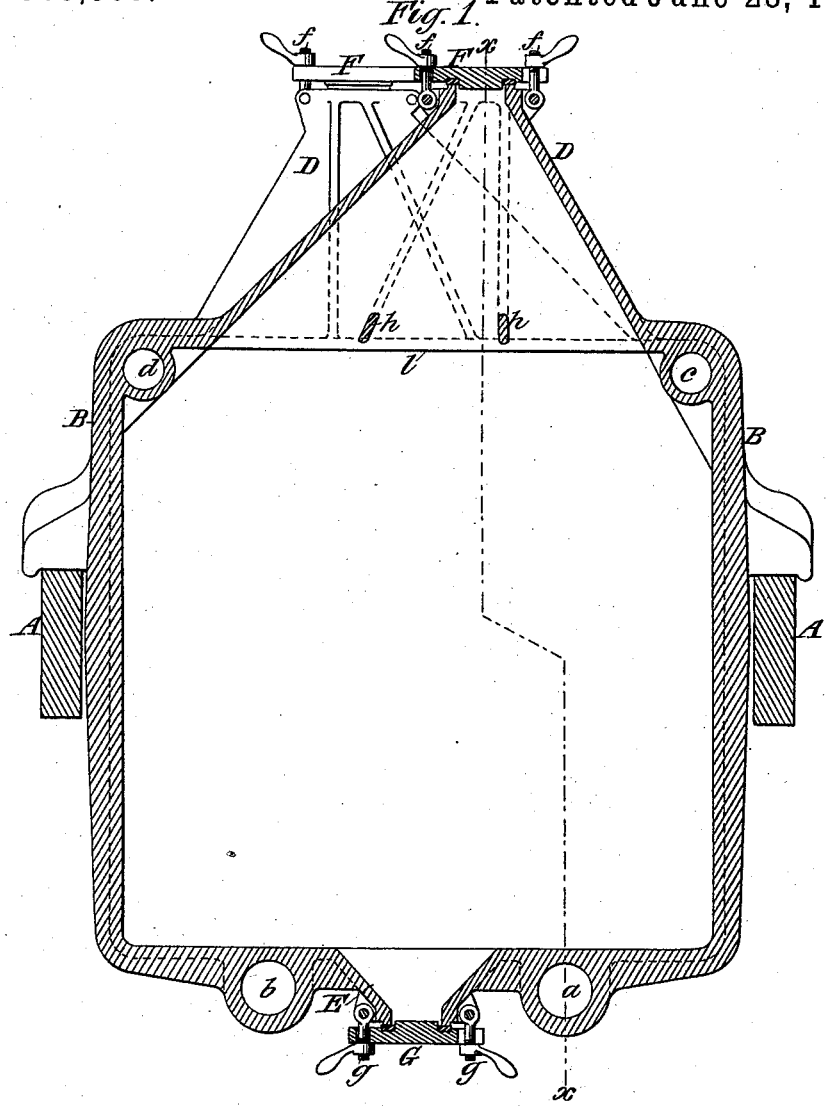
Figure 3:
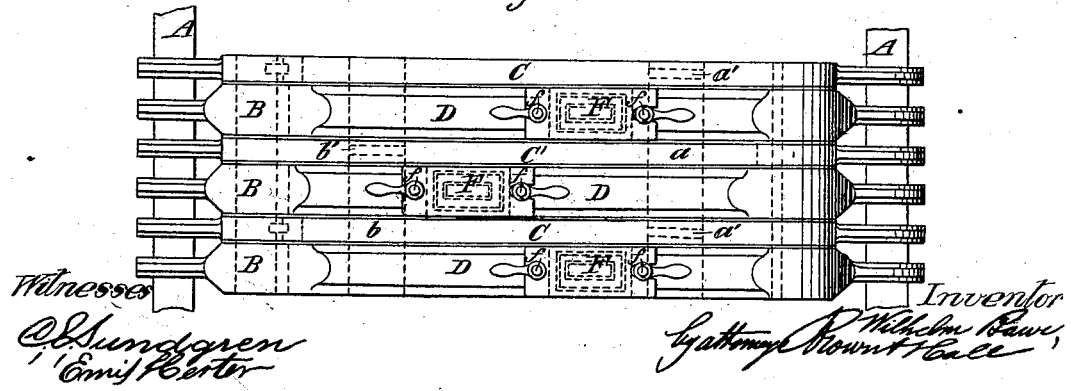

Figure 1 represents a vertical section parallel with its face of one of the filter frames or chambers of the press. Fig. 2 is a vertical section at right angles to Fig. 1 of several of the filter-plates and filter frames or chambers of the press, in a plane corresponding with the line $x\ x$ in Fig. 1. Fig. 3 is plan corresponding with Fig. 2. Fig. 4 is a face view of one of the filter-plates. Fig. 5 is a horizontal section of the said plate; and Fig. 6 is a face view of a filter frame or chamber, illustrating the application of the invention to a filter-press of a different kind from that shown in the other figures.

Similar letters of reference designate corresponding parts in all the figures.

A A designate the side bars of the press supporting the filter frames or chambers B B and the filter-plates C C'. The said filter-frames and filter-plates have provided in them, as is usual, holes $a\ b$, which communicate through the whole series to form inlet and discharge channels for the liquid undergoing filtration, and holes $c\ d$, which communicate in a similar manner to constitute air - passages; but the channels differ from those in the filter-presses heretofore in use, in that there is no channel communicating directly with the interiors of the filter-frames B, and in that while every other one of the filter-plates, as C C, contain T-shaped passages $a'$, communicating only with the inlet-channel $a$, the alternate or intervening plates C' C' contain similar passages, $b'$, communicating only with the discharge-channel $b$, as may be understood by reference to Figs. 2 and 3, in the former of which figures the passages $a'$ are shown in full outline and those $b'$ in dotted outline. In other respects the filter-plates are like those in common use, having their faces vertically corrugated or grooved and provided with transverse grooves $i\ j$ at top and bottom, as shown in Figs. 4 and 5, to suit the liquid to be filtered.

Between the filter-frames B B and filter-plates C and C' are secured the pervious partitions $e$, which may be of cloth of any suitable kind, or of wire-gauze, or of both, or any suitable fabric, according to the nature of the liquid to be filtered and of the filtering material used, a suitable packing being used around the edges when the said cloth or fabric is not of itself adapted to form a packing. The filter-frames B B are like those of the filter-presses in common use, except that, as previously stated, they have no channel in direct communication with their interiors or chambers, and that each is furnished at the top with an elevated filling-head, D, through which to fill it with the filtering material after the frames and plates have been put together. These filling-heads diminish in width toward the top or mouth, and their mouths are furnished with lids F, which are packed and capable of being fastened air-tight by screws $f$. The said filling-heads on alternate frames are offset in one direction, and those on the intervening frames are offset in the opposite direction from the centers of the frames, as may be seen by reference to Figs. 1 and 3, thereby bringing their mouths farther apart, and so affording convenience for filling the frames, which would be difficult if the mouths were all in one line, owing to the narrowness or thinness of the frames and consequent closeness of the mouths of the heads. The filter-frames are also provided at their bottoms with tapering discharge-outlets E, which are fitted with tightly-packed traps G, which are secured by screws and nuts $g$.

The filling-heads D serve as reservoirs for a certain amount of filtering material, which will descend into the frames or chambers by gravitation to compensate for any shrinkage of the material in the latter. The said filling-heads may be cast with the frames, as shown. They have cross-braces $h$ cast in them to strengthen them, the said braces being arranged some distance above the upper line, 1, of the interior of the chamber of the frame, (see Figs. 1 and 2,) in order that any space below them which they might prevent from filling with the filtering material will be above the said line 1, and the interior of the body of the frame will be full of the filtering material, and no liquid could pass through any frame from one filter-plate to the other on either side of it without passing through the filtering material.

In the operation of the filter-press the liquid to be filtered enters through the channel $a$, and is thence distributed through the T-shaped passages $a'$ into the grooves or channels in the opposite faces of the several filter-plates C, which may be termed the "receiving-plates," and thence passes in opposite directions, as indicated by arrows in Fig. 2, through the cloth or fabric on opposite sides of the said plates C into the filtering material with which the filter-frames B on each side of said plates C are filled. After passing through the charcoal in these frames the liquid passes through the cloth or fabric $e$ on the other side of each of the filter-frames and through the grooves and the passages $b'$ of the alternating plates C', which may be termed the "discharging-plates," and out through the discharge-channel $b$.

An important function of the filling-heads D, besides that of providing for the filling of the filter-frames with filtering material, is that of air-chambers, the air which is unavoidably retained in them being compressed by the action of the force-pump of the filter-press, and serving by its elasticity to compensate for fluctuations in the working of the said pump.

The essential feature of my invention, consisting of the provision for filling the frames or chambers with filtering material, is applicable to various kinds of filter-presses, without regard to the arrangement of their inlet and discharge passages, by substituting for the filter-frames previously used in them filter-frames with hoppers or openings at the top for the introduction therein of charcoal or other filtering material.

The arrangement of channels represented in Figs. 1, 2, 3, 5, and 6, though convenient, is by no means essential, but has only been selected for illustration because it serves as well as any other to explain the invention; and it may be here mentioned that the discharge-passage $b$ (represented in Figs. 1, 2, and 4 running through the whole of the plates) may be entirely done away with by placing, as shown in dotted outline in Fig. 4, a cock, $m$, on each one of the alternating plates C', which contain the discharge-passages, and making all the said cocks discharge into a trough, $n$, which is a common method of providing for the outlet of the filtered liquid in certain kinds of filter-presses.

The example of filter-frame shown in Fig. 6 only differs from filter-frames in common use in having the filling-head at the top and the discharge-trap at the bottom. The inlet and outlet channels $a$ and $b$ are arranged at the sides, the inlet-channel $a$ being at the bottom and the outlet-channel $b$ at the top, in a manner well known.

What I claim as my invention, and desire to secure by Letters Patent, is—

1. The combination, in a filter-press, with alternating filter frames or chambers and interposed filter-plates and pervious partitions, of elevated filling-heads arranged above and communicating with said frames or chambers and provided with tight lids, substantially as herein described, whereby provision is afforded for filling said frames or chambers with filtering material and retaining a quantity of said material in reserve above said frames or chambers, and air-chambers are formed above said frames or chambers and said plates and pervious partitions, as herein set forth.

2. The combination, with the chambers or plates of a filter-press, of elevated filling heads diminishing in width in an upward direction, and every other one having the mouth offset in one direction and the intervening ones having the mouths offset in the opposite direction from the center of the frame, substantially as and for the purpose herein set forth.

WILHELM BAUR.

Witnesses:
 FREDK. HAYNES,
 EMIL HERTER.